(12) United States Patent
Kobayashi

(10) Patent No.: US 12,726,704 B2
(45) Date of Patent: Sep. 1, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masaaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 18/814,782

(22) Filed: Aug. 26, 2024

(65) Prior Publication Data

US 2025/0080844 A1 Mar. 6, 2025

(30) Foreign Application Priority Data

Aug. 30, 2023 (JP) ................................ 2023-139524

(51) Int. Cl.
*H04N 23/68* (2023.01)
*H04N 13/106* (2018.01)

(52) U.S. Cl.
CPC ....... *H04N 23/683* (2023.01); *H04N 23/6812* (2023.01); *H04N 13/106* (2018.05)

(58) Field of Classification Search
CPC ............. H04N 23/683; H04N 23/6812; H04N 13/106; H04N 13/239; H04N 13/246; H04N 13/296; H04N 23/60; H04N 23/687
See application file for complete search history.

(56) References Cited

U.S. PATENT DOCUMENTS 5,682,556 A * 10/1997 Iwane ................ H04N 23/6812 396/206
6,151,068 A * 11/2000 Ikeda .................. H04N 1/2369 348/208.99
6,734,901 B1 * 5/2004 Kudo ................ H04N 23/6815 348/208.4
9,160,904 B1 * 10/2015 Chang .................. F16M 13/027
9,591,220 B2 3/2017 Kobayashi
9,838,677 B1 * 12/2017 Ramaswamy ....... H04N 17/002
10,652,521 B2 5/2020 Itoh
10,992,921 B1 * 4/2021 Cui ........................ B64D 43/00
2006/0056839 A1 * 3/2006 Abe ....................... G03B 19/12 396/452
2007/0146488 A1 * 6/2007 Higurashi ............. H04N 23/68 348/E5.046
2011/0169918 A1 * 7/2011 Yoo ...................... H04N 13/296 348/46

(Continued)

FOREIGN PATENT DOCUMENTS

JP 2017-135495 A 8/2017

*Primary Examiner* — Timothy R Newlin
(74) *Attorney, Agent, or Firm* — Venable LLP

(57) ABSTRACT

An image processing apparatus for calibrating an image capture apparatus that includes an optical system and an imaging sensor, the image processing apparatus including: an obtaining unit configured to obtain an image captured by the image capture apparatus; a detection unit configured to detect whether vibration occurred in the image capture apparatus; and an updating unit configured to in a case where the detection unit detects that the vibration occurred, update calibration information to correct the image captured by the image capture apparatus based on the captured image obtained by the obtaining unit.

14 Claims, 11 Drawing Sheets

(56) References Cited

U.S. PATENT DOCUMENTS

| | | | | |
|---|---|---|---|---|
| 2015/0317781 | A1* | 11/2015 | Napier | G06T 7/85 348/46 |
| 2015/0365598 | A1* | 12/2015 | Tanaka | H04N 23/6812 348/208.2 |
| 2016/0227120 | A1* | 8/2016 | Lee | H04N 23/687 |
| 2017/0070731 | A1* | 3/2017 | Darling | G06T 7/85 |
| 2017/0104979 | A1* | 4/2017 | Shaw | H04N 13/239 |
| 2017/0309002 | A1* | 10/2017 | Koyano | G06T 5/80 |
| 2018/0027206 | A1* | 1/2018 | Li | G06F 3/04842 348/333.02 |
| 2018/0165833 | A1* | 6/2018 | Inoue | H04N 17/002 |
| 2018/0309978 | A1* | 10/2018 | Nobori | H04N 13/239 |
| 2019/0028688 | A1* | 1/2019 | Kumar | H04N 13/246 |
| 2019/0037205 | A1* | 1/2019 | Itoh | G02B 7/023 |
| 2019/0191146 | A1* | 6/2019 | Koyama | H04N 5/222 |
| 2020/0236338 | A1* | 7/2020 | Mitani | G06T 7/00 |
| 2021/0018820 | A1* | 1/2021 | Noda | G06F 3/016 |
| 2022/0201211 | A1* | 6/2022 | Tsuchiya | H04N 23/6812 |
| 2023/0206386 | A1* | 6/2023 | Kobayashi | G06T 11/00 382/103 |
| 2023/0360236 | A1* | 11/2023 | Hasegawa | G06T 7/80 |
| 2024/0007613 | A1* | 1/2024 | Kumarasamy | G06T 7/80 |
| 2024/0007614 | A1* | 1/2024 | Miginnis | H04N 17/002 |
| 2024/0331199 | A1* | 10/2024 | Laroia | H04N 13/271 |
| 2025/0227381 | A1* | 7/2025 | Ito | H04N 23/667 |

* cited by examiner

IMAGE PROCESSING APPARATUS, IMAGE PROCESSING METHOD, AND STORAGE MEDIUM

BACKGROUND

Field

The present disclosure relates to calibration of an image capture apparatus.

Description of the Related Art

In an image capture apparatus, the optical axis of a lens optical system is sometimes misaligned. One of the possible methods to correct the influence of the misalignment of the optical axis on an image captured by the image capture apparatus is calculating calibration information and correcting the captured image by taking into account the calculated calibration information.

Japanese Patent Laid-open No. 2017-135495 describes a method of, in a case where camera settings are changed by user's operation, estimating camera parameters as calibration information and correcting a stereo image.

SUMMARY

An image processing apparatus of the present disclosure is an image processing apparatus for calibrating an image capture apparatus that includes an optical system and an imaging sensor, the apparatus including: an obtaining unit configured to obtain an image captured by the image capture apparatus; a detection unit configured to detect whether vibration occurred in the image capture apparatus; and an updating unit configured to in a case where the detection unit detects that the vibration occurred, update calibration information to correct the image captured by the image capture apparatus, based on the captured image obtained by the obtaining unit.

Further features of the present disclosure will become apparent from the following description of exemplary embodiments with reference to the attached drawings.

DESCRIPTION OF THE EMBODIMENTS

Figure 1:
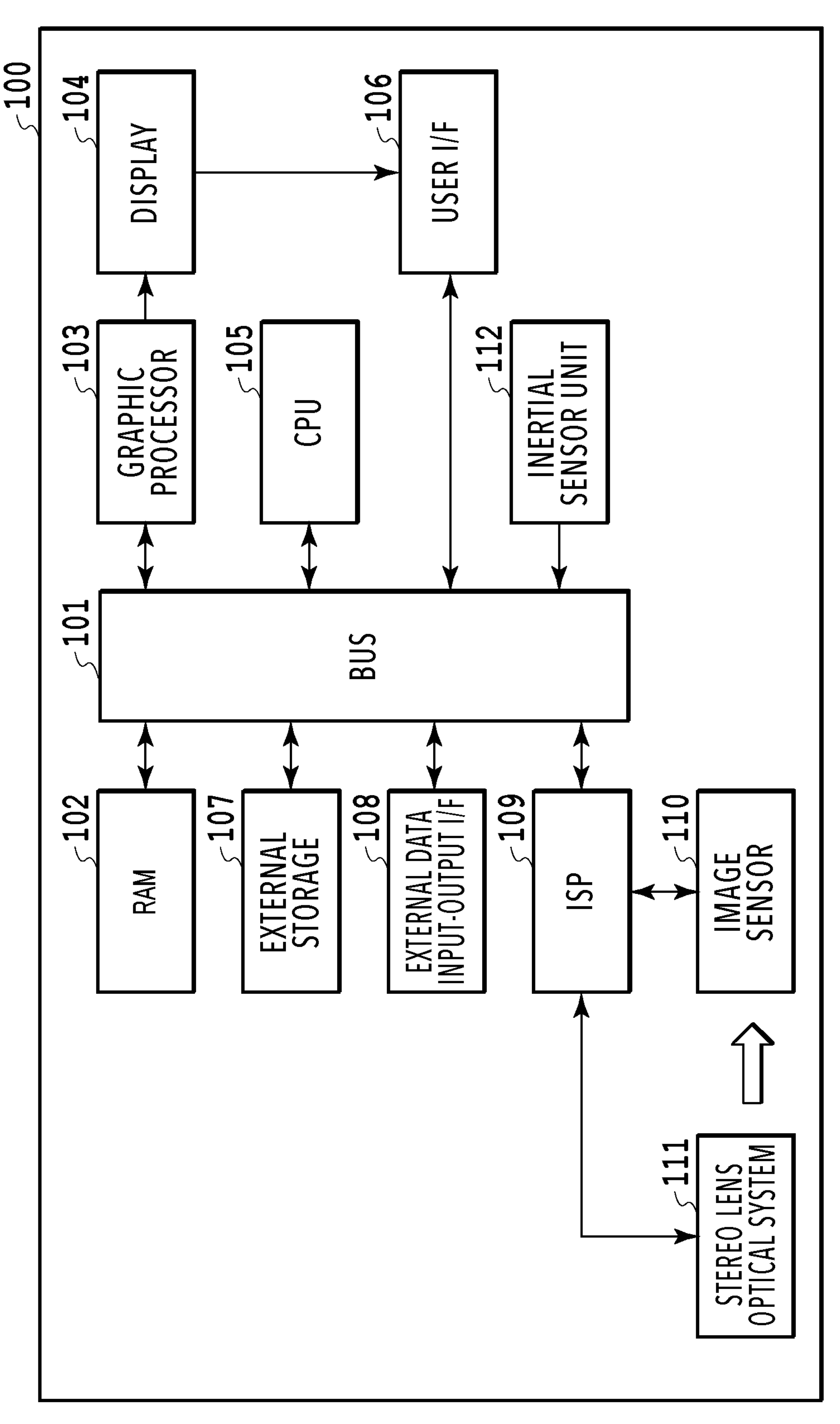
FIG. 1 is a diagram illustrating the internal configuration of a camera.

Hereinafter, the technique of the present disclosure will be described in detail based on embodiments with reference to accompanying drawings. The following embodiments are just illustration of concrete examples to implement the technique of the present disclosure and will not give limited interpretation of the technical range of the present disclosure. The technique of the present disclosure can be implemented in various forms without departing from its technical idea or its major characteristics.

In a case where vibration occurs in a camera due to a contact between the camera and a tripod or the like, the lens attached to the camera could be displaced. In such a case, calibration information created before the vibration occurs in the camera becomes inappropriate. With the method of updating calibration information by user's operation like Japanese Patent Laid-open No. 2017-135495, if no user operation is performed after vibration occurs in the camera, the captured image will be corrected based on inappropriate calibration information. This can result in creating an image looking unnatural.

Embodiment 1

There is a method to display a virtual reality (VR) image by displaying in real time, an image cut out of a fisheye image according to the visible field of view of a head mounted display (HMD) with respect to the front direction while detecting the tilt of the HMD. Displaying stereo images on right and left displays of the HMD also enhances the sense of presence.

In a case of capturing images with a camera that includes right and left lens optical systems (a stereo lens optical system) in order to obtain stereo images, the lens optical systems can be subject to optical axis misalignment with respect to the imaging sensor. Such optical axis misalignment will increase vertical misalignment of the same subject between a left image obtained through the left lens optical system and a right image obtained through the right lens optical system. The right and left images with the optical axes misaligned can be fisheye images. In a case where the right and left images obtained by converting such right and left fisheye images into equirectangular are viewed with a head mounted display (HMD), vertical misalignment prevents human eyes from fusing images of the subject.

The lens optical systems of a camera that are interchangeable and are attached to the mount in the camera body to be used are prone to physical misalignment. The lens optical systems are normally replaced while the camera is powered off. Therefore, if calibration can be performed at the time an image in focus is obtained after the camera is powered on, irrespective of whether the image is captured or not, calibration information resulting from the calibration can be used to correct images at subsequent image captures.

Also in a case of combining plural images captured by respective plural image capture apparatuses, it is desirable to perform image conversion for the plural images taking calibration information into account.

The lens optical system attached to a camera is sometimes subjected to vibrations in cases where the camera gets installed on a tripod and the like, someone touches the camera, or the camera receives vibrations from the floor. Such vibrations transmitted to the lens optical system could cause the aforementioned optical axis misalignment. In this case, the optical axis misalignment sometimes cannot be corrected with calibration information obtained by calibration performed before. In Embodiment 1, a method to detect an occurrence of vibration and perform calibration of optical axis misalignment in response to the detection of vibration will be described.

[Configuration of Image Capture Apparatus]

FIG. 1 is a diagram illustrating the internal configuration of a camera 100. A CPU 105 controls the operation of the entire camera in cooperation with the other constituent elements based on computer programs, such as an operating system (OS) and an application program. In the description of Embodiment 1, the camera 100 includes the single CPU 105. However, the camera 100 is not limited thereto and may be configured to include plural CPUs. Each process in such a case can operate in parallel by multithreading. A bus 101 is responsible for the flow of data within the camera 100.

A RAM 102 is a random-access memory. A graphic processor 103 performs computation necessary for displaying an image on a display 104. The graphic processor 103 is a processor that enables real-time encoding and decoding of an image. A user I/F 106 is an interface (I/F) integrally coupled to a touch panel, a switch, a button, and the like and accepts user operations, such as starting or stopping video recording.

The display 104 is a display apparatus configured to display commands inputted from the user I/F 106, outputs from a personal computer (PC) in response to the commands, and the like. User interface (UI) screens or processed images can be displayed on the display 104 through the graphic processor 103. The graphic processor 103 is able to perform geometric transformation of an inputted image and is also able to input and output an image to and from the RAM 102 or directly output an image to the display 104.

An external storage 107 is a non-volatile storage unit and is configured to serve as a so-called memory card. An external data input-output I/F 108 exchanges data through a network.

A stereo lens optical system 111 is arranged such that incident light forms an image on an image sensor 110. The stereo lens optical system 111 of Embodiment 1 includes two right and left lenses, each of which is a fisheye lens with an angle of view of 180 degrees. The images obtained through the respective two lenses are focused on the same image sensor 110, forming right and left fisheye images (a stereo fisheye image) corresponding to the respective right and left lenses. The stereo lens optical system 111 is interchangeable and is coupled to a mount 201 (see FIG. 2) to be fixed to the camera body.

The stereo lens optical system 111 is controlled by the CPU 105 through an ISP 109. The CPU 105 controls image captures by adjusting the aperture, focus, and other settings of the stereo lens optical system 111. The following description assumes that the imaging sensor 110 is driven so as to obtain image data, at one frame per 33.333 ms (hereinafter, described as 33 ms), that is, at 30 fps. The data of captured images are temporarily stored in the RAM 102.

The image sensor 110 converts light obtained with the stereo lens optical system 111 into digital image data. In Embodiment 1, the image sensor 110 converts light into Bayer array digital image data. An image obtained by an image capture with light rays passing through the left lens of the stereo lens optical system 111 is called a left image, and an image obtained by an image capture with light rays passing through the right lens is called a right image, unless otherwise specified. The right and left images are collectively called right-left images or stereo images.

The ISP 109 is an image signal processor and is a dedicated processor for image processing. The ISP 109 processes the Bayer array digital image data obtained by the image sensor 110 to create an RGB image and stores the created RGB image in the RAM 102. The internal image format is RGB image format in the description of Embodiment 1 but is not limited thereto. The internal image format may be YUV image format, monochrome luminance image format, or the like.

The stored image data are subjected to high-quality image processing and encoding processing by the CPU 105 or the graphic processor 103, and the resultant data are recorded in the external storage 107. To obtain an image (image data) means to obtain the image (image data) from the ISP 109 or the external storage 107.

An inertial sensor unit 112 is composed of a three-axis gyro sensor and a three-axis capacitive accelerometer. An inertial sensor unit is usually used to detect the direction of gravity for displaying a level on the display or to detect shaking for vibration control. However, in Embodiment 1, the inertial sensor unit 112 is used to detect an impact and a vibration. The details thereof will be described later.

Inertial information obtained from the inertial sensor unit 112 is subjected to correction, such as denoising, by the CPU 105, and the resultant data are then stored in the RAM 102 as a ring buffer capable of storing 10 seconds worth of data. The inertial information will be described as information already corrected as described above. Furthermore, the inertial information is stored in the ring buffer capable of storing 10 seconds worth of data while the inertial information is recorded as information synchronous with images captured by the image sensor 110. The inertial information of Embodiment 1 is information allowing the CPU 105 to determine whether the camera 100 was subjected to strong external force, that is, whether an occurrence of strong vibration was detected. The inertial information for image data during the image capture process is obtained from the inertial sensor unit 112. The inertial information for image data already recorded can be obtained at the same time the image data are obtained, by previously assigning the inertial information corresponding to the image data as meta data.

The accelerometer information contained in the inertial information is composed of three values, X, Y, and Z, corrected with the gravitational components canceled. The accelerometer information is composed of information of eight sets of X, Y, and Z as described above, each set being for a unit time of 33 ms in one frame's worth divided by eight, that is, 4.167 ms. The frame rate may be other than 30 fps. For example, the frame rate may be 29.97 fps, 50 fps, 60 fps, so on. In such a case, the unit time of the accelerometer information is set to a value that can be obtained by dividing the reciprocal of the frame rate by an integer and is close to 4 ms. For example, the unit time is 4 ms in a case where the frame rate is 50 fps and 4.167 ms in a case where the frame rate is 60 fps.

In Embodiment 1, the program and data to be executed are recorded in the external storage 107. The program and data are inputted and stored in the RAM 102 and are then executed by the CPU 105. Inputs and outputs of the program and data are made through the bus 101. Processing data are recorded in the external storage 107 or stored in the RAM 102 so as to be shared with another program.

[Optical Axis Misalignment]

Figure 2A:
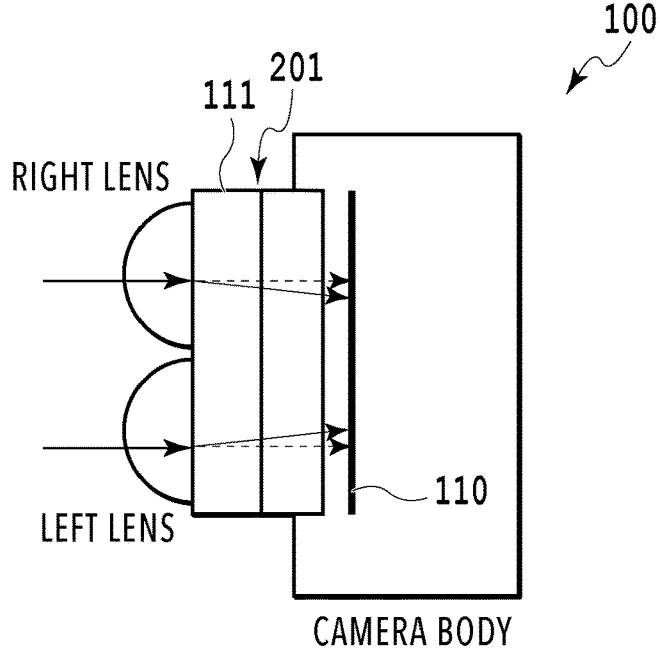
FIGS. 2A and 2B are diagrams schematically illustrating optical axis misalignments.
Figure 2B:
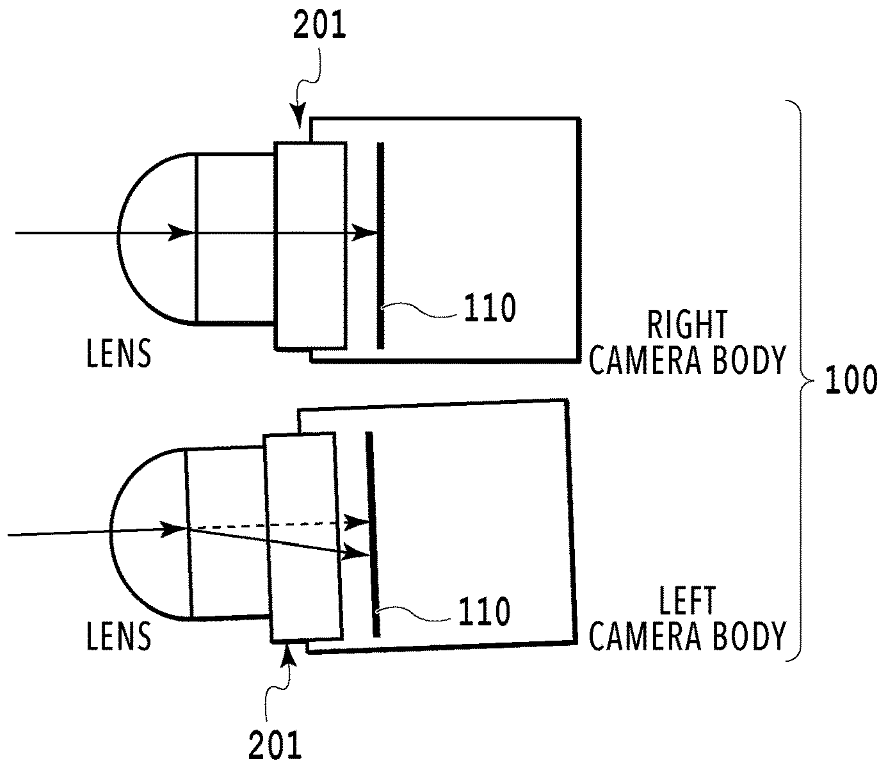

FIGS. 2A and 2B are diagrams schematically illustrating deviation (optical axis misalignment) of optical axes. FIG.

2A illustrates the camera 100, in which stereo fisheye lenses as the stereo lens optical system 111 of Embodiment 1 are attached to the mount 201. Solid arrows in FIGS. 2A and 2B indicate trajectories of incident light rays. For example, in a state where the optical axes of the right and left lenses are misaligned, rays of light (light incoming from infinity) supposed to enter the image sensor 110 from the respective center positions of the right and left lenses are, after passing through the right and left lenses, not parallel to each other and not incident at right angles to the sensor surface of the image sensor 110. This causes misalignment in images viewed by an HMD. It is therefore desirable that, to a maximum extent, a light ray passing through the left lens optical system be vertical to the sensor surface as indicated by the dotted arrow and light rays (right and left light rays) passing through the left lens optical system and the right lens optical system be parallel to each other. The calibration information is therefore information about how much the offset of the optical axis center of each fisheye image and how much the tilt of each optical axis needs to be corrected in order that the right and left light rays are vertical to the sensor surface and are parallel to each other. By performing conversion into equirectangular images taking into account the offset misalignment of the optical axis centers of the fisheye images and the tilt of the optical axes, it is possible to obtain equirectangular images less influenced by the optical axis misalignment. Correcting the tilt of an optical axis has the same meaning as creating an equirectangular image with the longitude and latitude on the equirectangular image shifted.

As illustrated in FIG. 2A, in the description of Embodiment 1, the camera 100 is an image capture apparatus in which right and left light rays from the stereo lens optical system 111 are focused to form images on the single image sensor 110 to create stereo images by way of example. The configuration of the image capture apparatus is not limited to such a configuration. For example, as illustrated in FIG. 2B, a camera may be configured to include plural optical systems such that a plurality of cameras includes a pair of the image sensor 110 and one of the right and left lens optical systems. In this case, the optical axis misalignment indicates that a light ray on the optical axis incoming from infinity is not incident at right angles to the sensor surface. The configuration of the camera system to which the method of Embodiment 1 is applicable is not limited as long as it includes a mechanism to detect an occurrence of vibration and determine calibration information like Embodiment 1.

[Functional Configuration]

Figure 3:
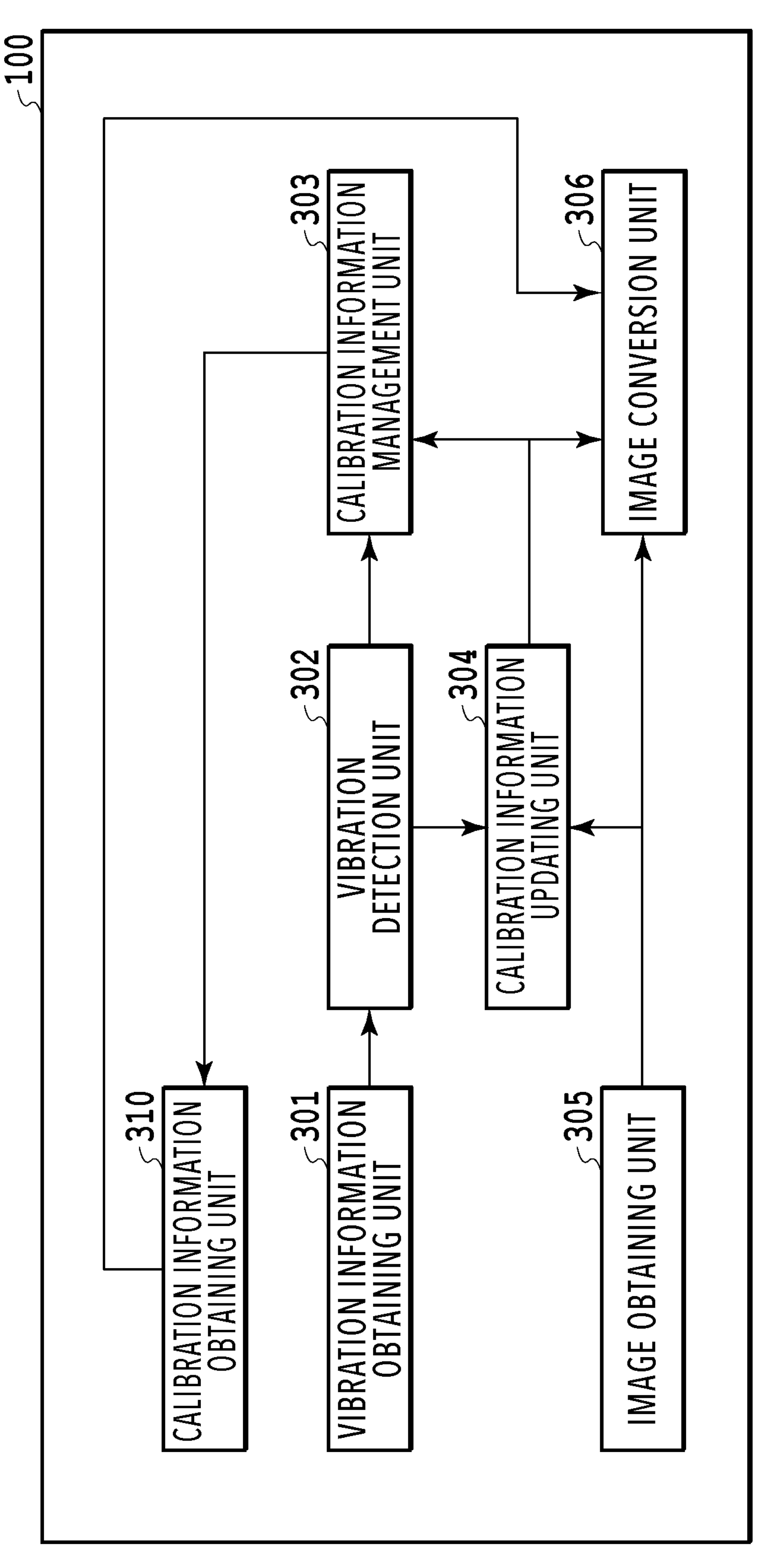
FIG. 3 is a diagram illustrating the functional configuration of the camera.

FIG. 3 is a diagram illustrating the configuration of functions of the camera 100 to determine the calibration information of a stereo image and performs image conversion. The camera 100 of Embodiment 1 includes a calibration information obtaining unit 310, a vibration information obtaining unit 301, a vibration detection unit 302, a calibration information management unit 303, a calibration information updating unit 304, an image obtaining unit 305, and an image conversion unit 306. The detail of processing to be executed by each functional unit in FIG. 3 will be described together with flowcharts later described.

The CPU 105 implements a function of each functional unit illustrated in FIG. 3 by performing control using a computer program and data stored in the external storage 107. The camera 100 may include one or plural dedicated hardware units different from the CPU 105, and at least a part of the processing by the CPU 105 may be executed by the dedicated hardware units. Examples of the dedicated hardware units are a processor used in image processing and control, an application specific integrated circuit (ASIC), a field programmable array (FPGA), and a digital signal processor (DSP).

[Flowchart]

Figure 4:
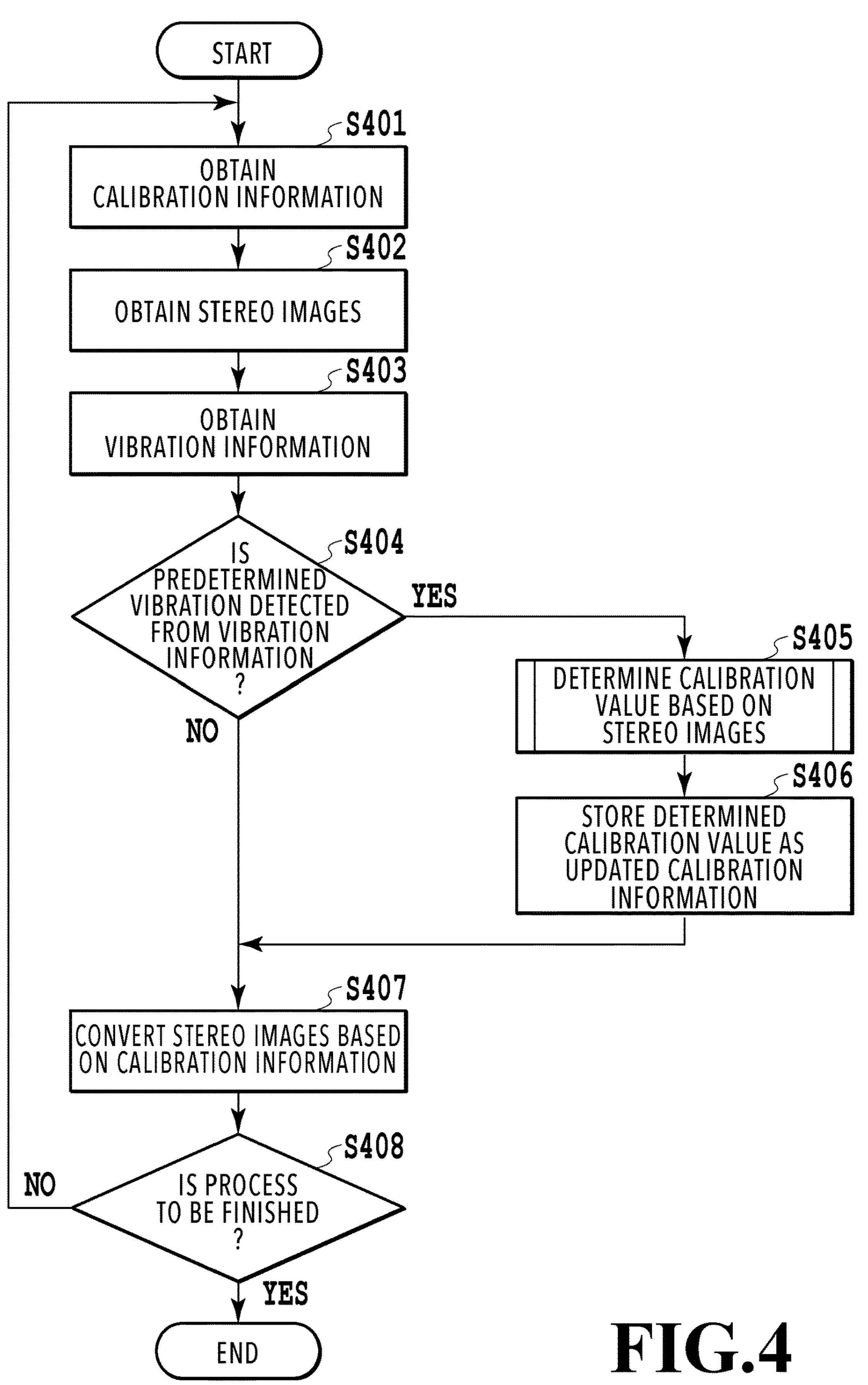
FIG. 4 is a flowchart for explaining a process to convert a stereo image based on calibration information.

FIG. 4 is a flowchart for explaining a process in Embodiment 1 to calculate calibration information and correct stereo images based on the calibration information while converting the stereo images. A series of processes illustrated in the flowchart of FIG. 4 is executed by the CPU 105 from "START" to "END" in the order indicated by arrows, unless otherwise described. Specifically, the series of processes illustrated in the flowchart is executed by the CPU 105 loading program codes in the RAM 102 and executing the same. The functions of a part or all of the steps in FIG. 4 may be implemented by hardware, such as an ASIC or an electronic circuit. Symbols "S" in the description of the process indicate steps in the flowchart. The flowchart in FIG. 4 is executed in a case where a video recording start button provided for the camera 100 is pressed.

In S401, the calibration information obtaining unit 310 obtains calibration information managed by the calibration information management unit 303. The calibration information management unit 303 stores and manages in the storage unit, the calibration information to be used by the image conversion unit 306 to perform image conversion involving correction of optical axis misalignment.

In Embodiment 1, the calibration information is information representing optical axis misalignment of the right lens in the stereo lens optical system 111 by horizontal and vertical inclinations and horizontal and vertical offset misalignments of the optical axis relative to the left lens.

At the start of the flowchart, the calibration information management unit 303 stores and manages in the storage unit, calibration information previously calculated. In a case where S405 later described was not executed, in S401, the calibration information obtaining unit 310 obtains calibration information including initial values. In a case where S405 was executed for the previous frame, in S401, the calibration information obtaining unit 310 obtains calibration information that was updated in S405 in the procedure for the previous frame.

In S402, the image obtaining unit 305 obtains stereo images of a target frame captured by the imaging sensor 110 with right and left light rays having passed through the stereo lens optical system 111. As described above, the obtained stereo images include right and left images that are fisheye images. The image obtaining unit 305 outputs the obtained stereo images to the calibration information updating unit 304 and the image conversion unit 306. In Embodiment 1, as the stereo images of the target frame, fisheye images of one frame in RGB color space that correspond to the respective right and left lens optical systems and are stored in the RAM 102 are obtained every 33 ms in synchronization with the image sensor 110. In a case where the image data are encoded, the image obtaining unit 305 sends the encoded data to the graphic processor 103 for decoding and obtains an image converted to the internal image format.

In S403, the vibration information obtaining unit 301 obtains vibration information and outputs the obtained vibration information to the vibration detection unit 302. In the description of Embodiment 1, the vibration information is accelerometer information from the inertial sensor unit 112. The vibration information obtaining unit 301 obtains from the ring buffer, the vibration information for 33 ms before the execution of S403. For example, the vibration information obtaining unit 301 obtains accelerometer information for 33 ms of the frame immediately before the current target frame. Each time S403 is executed, continuous accelerometer information can be obtained without excess or deficiency.

In S404, the vibration detection unit 302 determines whether a predetermined vibration occurred in the camera 100. In a case where the vibration detection unit 302 detects an occurrence of the predetermined vibration based on the accelerometer information obtained in the S403, the vibration detection unit 302 determines that the predetermined vibration occurred in the camera 100. The vibration detection unit 302 outputs the determination result to the calibration information updating unit 304.

The vibration detection unit 302 calculates, for example, norms for the XYZ data, which is the acceleration information in 4.167 ms units and is contained in the accelerometer information for 33 ms obtained in S403. The vibration detection unit 302 detects an occurrence of the predetermined vibration in a case where one or more norms suggest that the camera 100 was subjected to an impact of 10 G or more. For example, an impact on the camera 100 due to contact between the camera 100 and a tripod or the like is detected as the predetermined vibration. The vibration detection unit 302 detects that the predetermined vibration occurred in the camera 100, for example, in a case where at least one of the eight sets of information in 4.167 ms units contained in one frame's worth of the accelerometer information represents that the camera 100 was subjected to an impact of 10 G or more.

In the description of Embodiment 1, whether the predetermined vibration (impact) occurred in the camera 100 is detected using the accelerometer information. However, the method of detecting occurrence of the predetermined vibration is not limited. Whether the camera 100 was subjected to the predetermined vibration may be detected based on gyro information. Typically, the gyro information is information on three-axis angular velocities. The predetermined vibration may be detected assuming that the predetermined vibration (impact) occurred in a case where the angular velocity obtained by expressing the information on three-axis angular velocities as a quaternion and performing spherical linear interpolation (Slerp) was higher than 100 degrees/second. The predetermined vibration may be detected not only based on the angular velocity but also based on a change in angular velocity per unit time. The information from the inertial sensor unit 112 is for not detecting the positional misalignment of the lenses of the camera 100 but for detecting changes in position and orientation of the camera and is just used to detect whether vibration occurred.

If the vibration detection unit 302 determines that the predetermined vibration occurred (YES in S404), the vibration detection unit 302 causes the procedure to proceed to S405 in order to operate the calibration information updating unit 304. In S405, the calibration information updating unit 304 is operated. If the vibration detection unit 302 determines that the predetermined vibration did not occur (NO in S404), the vibration detection unit 302 allows the procedure to proceed to the process to S407.

In S405, the calibration information updating unit 304 determines a calibration value corresponding to the stereo images of the current target frame obtained in S402. The processing in S405 is executed as a sub-routine. The processing in S405 will be described in detail later.

In S406, the calibration information updating unit 304 replaces the calibration information before update that is currently stored and managed in the storage unit by the calibration information management unit 303, with the calibration value determined in S405, to update the calibration information to be used by the image conversion unit 306. The calibration information updating unit 304 outputs the updated calibration information to the image conversion unit 306.

In S407, the image conversion unit 306, using the inputted calibration information, converts the stereo images of the target frame obtained in S402 to right and left equirectangular images (stereo equirectangular images) with the optical axis misalignment corrected. Thus, the image conversion unit 306 also serves as a corrector that corrects the optical axis misalignment. Such processing of conversion to the equirectangular images involving correction of optical axis misalignment, is performed one after another for stereo images successively inputted.

In a case where it is determined that the predetermined vibration occurred, the updated calibration information as calibration values determined in previous S405 is inputted, and the processing of conversion into equirectangular images involving correction of optical axis misalignment is performed based on the updated calibration information. In a case where it is determined that the predetermined vibration did not occur, the calibration information obtained by the calibration information obtaining unit 310 in S401 is inputted to the image conversion unit 306, and the conversion processing into equirectangular images involving correction of optical axis misalignment is performed based on the updated calibration information.

The image conversion by the image conversion unit 306 is performed by the graphic processor 103 controlled by the CPU 105. Alternatively, the ISP 109 may be configured to include an image conversion function and may perform the image conversion in S407. In addition, the target image may be buffered, and the image conversion may be performed for the buffered image. That is, the image conversion may be performed asynchronously with image captures and may tolerate output delays.

The image projection method in VR is typically equirectangular projection, and captured images are often converted into equirectangular images and stored. Therefore, it is efficient to perform the reflection of the calibration information in the process of conversion into equirectangular images, and in the description of Embodiment 1, the image conversion executed in S407 is conversion into equirectangular images involving correction of optical axis misalignment. The image conversion executed in S407 needs to be a geometrical deformation involving optical axis correction, but the method of image conversion is not limited.

Figure 5C:
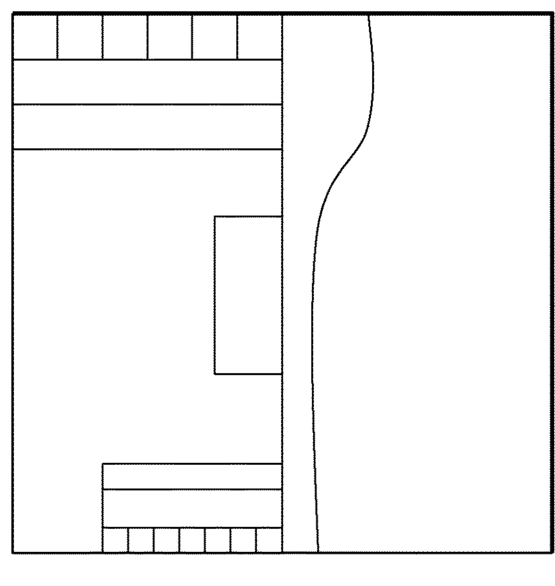
FIGS. 5A to 5C are diagrams for explaining image conversion.
Figure 5C:
Figure 5B:
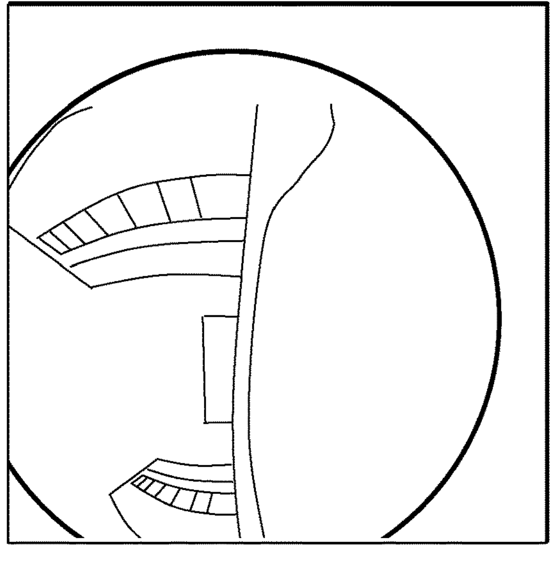
Figure 5A:
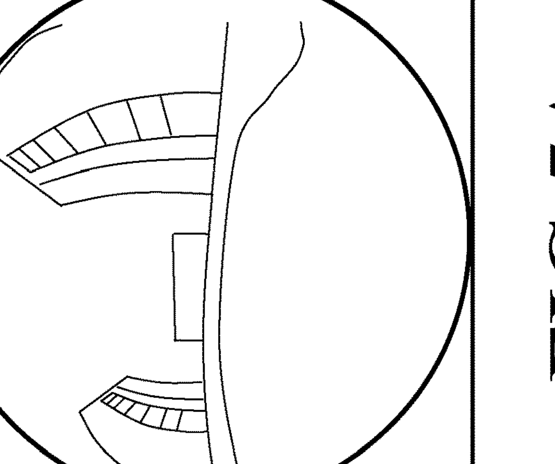

FIGS. 5A to 5C are diagrams for explaining the image conversion executed in S407. The images in FIGS. 5A to 5C illustrate the right image constituting stereo images. FIG. 5A is a diagram illustrating a fisheye image that is obtained in a case where the optical axis is at the position indicated by the solid arrow in FIG. 2A and does not need to be corrected. FIG. 5B is a diagram of an image that needs to be corrected with calibration information. This image is obtained in a case where the optical axis of the right lens is shifted to the upper left and the image from the optical system is also shifted to the upper left. Actually, the optical axis is rarely shifted to such an extent, and FIG. 5B is illustrated for an explanatory purpose. FIG. 5C illustrates an image obtained by performing the processing of conversion into an equirectangular image involving correction of optical axis misalignment for the image of FIG. 5B. In cases where the calibration information set as described above is correct, the conversion into an equirectangular image involves deformation that corrects optical axis misalignment.

In the description of Embodiment 1, optical axis misalignment is corrected using the calibration information in the process of coordinate conversion. However, the image itself may be converted based on the calibration information. Detecting movement from the corrected image can improve the degree of movement detection accuracy.

In S408, the image conversion unit 306 determines whether to terminate the process. With regard to the method of determining whether to terminate the process, in Embodiment 1, the image conversion unit 306 determines to terminate the process upon a recording stop button of the camera 100 being pressed by the user. The aforementioned button presses are detected based on information from the user I/F 106.

If it is determined to terminate the process (YES in S408), the flowchart in FIG. 4 is terminated. If it is determined to continue the process, the process returns to S401. The next processing from S401 to S407 is executed with the subsequent frame set as the target frame. Specifically, in S402, the stereo images of the subsequent frame are obtained, and in S403, new vibration information is obtained. In S407, image conversion is performed for the stereo images of the subsequent frame. According to the flowchart in FIG. 4, by repeatedly executing S402 to S407 every 33 ms in synchronization with the image sensor 110 until the process is terminated, stereo images are successively obtained while image conversion reflecting calibration information on the stereo images is performed.

[Updating Process of Calibration Information]

Figure 6:
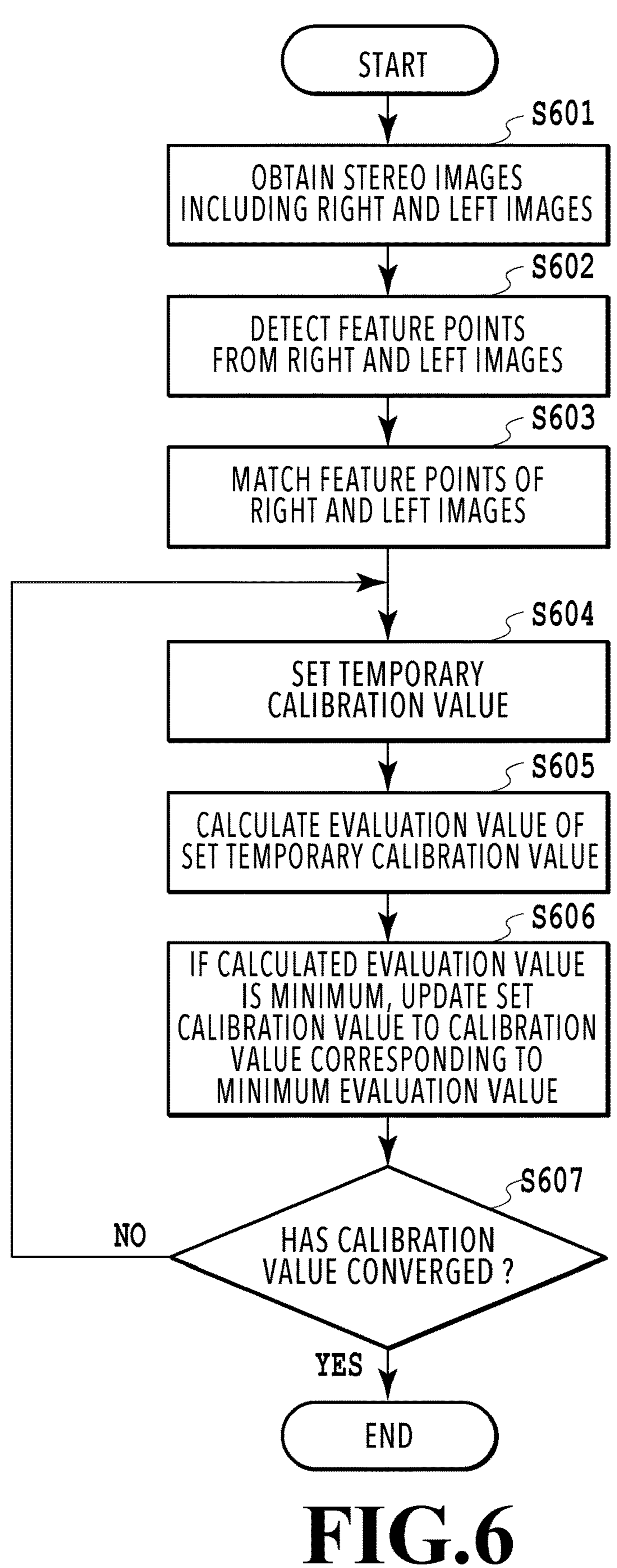
FIG. 6 is a flowchart for explaining a process to determine a calibration value corresponding to a stereo image.

FIG. 6 is a flowchart for explaining in detail a method to determine a calibration value corresponding to the obtained stereo images. Using the flowchart in FIG. 6, the process to determine the calibration information to correct optical axis misalignment in S405 will be described in detail.

In S601, the calibration information updating unit 304 obtains stereo images composed of right and left images. The images to be obtained are specified by the caller of the flowchart in FIG. 6. For example, the calibration information updating unit 304 obtains the stereo images of the target frame obtained in S402.

In S602, the calibration information updating unit 304 detects feature points from the right and left images constituting the stereo images. In cases where the internal image format is RGB color image format or YUV image format, the obtained stereo images are converted into luminance images for detection of feature points.

In Embodiment 1, the calibration information updating unit 304 detects feature points from each of the right and left images by the ORB algorithm. In Embodiment 1, the CPU 105 performs calculation to determine the feature points. In a case where the ISP 109 has a dedicated circuit, the ISP 109 may calculate to determine the feature points.

In S603, the calibration information updating unit 304 matches the feature points of the right and left images. In Embodiment 1, the calibration information updating unit 304 calculates ORB feature amounts corresponding to the feature points of the right and left images and matches the feature points of the right and left images with the minimum Hamming distance therebetween. The processing in S603 is performed by the CPU 105. However, in a case where the ISP 109 has a dedicated circuit, the processing in S603 may be performed by the ISP 109.

In the above description, the feature points are detected by the ORB algorithm. However, the detection method of feature points is not limited. The feature points may be detected and matched by another method, for example, such as a SIFT method. Alternatively, the feature points may be matched using template matching.

In S604, the calibration information updating unit 304 sets a temporary calibration value. In Embodiment 1, the temporary calibration value includes elements indicating horizontal and vertical tilts of optical axes and horizontal and vertical offset misalignments of optical axes. The calibration information updating unit 304 sets a different temporary calibration value at each execution of S604 such that the temporary calibration values converge through so-called iterative calculation. The method for value convergence through iterative calculation includes the steepest descent method, the Newton's method, the Nelder Mead method, Levenberg-Marquardt algorithm, or the like. Embodiment 1 employs the Nelder-Mead method, which is comparatively robust to outliers.

In S605, the calibration information updating unit 304 calculates an evaluation value to evaluate the set temporary calibration value. Specifically, based on the coordinates of each pair of matched feature points of the right and left images, the calibration information updating unit 304 specifies the directions of light rays by using the temporary calibration value set in S603. Then, the calibration information updating unit 304 calculates the closest distance of each pair of light rays and calculates the sum of squares of the closest distances of all the pairs of light rays corresponding to all the pairs of feature points as the evaluation value for the temporary calibration value.

The XY coordinate system of a fisheye image as ideal equidistant projection not including distortion and not requiring calibration can be converted to polar coordinates. In Embodiment 1, the XY coordinate system is subjected to distortion removal and is converted into polar coordinates taking into account the inclination and offset misalignment of the optical axes indicated by the temporary calibration value. The polar coordinates correspond to the direction of the light ray passing through the entrance pupil. Therefore, the light ray is uniquely located in a three-dimensional space with the origin set to the center of the entrance pupils of the two lenses. The more correct the temporary calibration value, the closer the two light rays corresponding to a pair of feature points, and the less correct the temporary calibration value, the farther apart the two light rays. That is, the more correct the temporary calibration value, the smaller the evaluation value calculated based on the temporary calibration value.

In S606, the calibration information updating unit 304 determines whether the evaluation value calculated in S605 is the minimum value among the evaluation values that have been calculated since the flowchart in FIG. 6 started. In a case where the evaluation value calculated in S605 is the minimum evaluation value, the calibration information updating unit 304 updates the temporary calibration value set in S604 to the temporary calibration value corresponding to the minimum evaluation value.

In a case where the evaluation value of the temporary calibration value set in current S604 is smaller than the previously held minimum evaluation value, the minimum evaluation value and the temporary calibration value corresponding to the minimum evaluation value are updated. Repeating this procedure allows the minimum evaluation value and the appropriate temporary calibration value corresponding to the minimum evaluation value to be retained. The method of the processing executed in S606 is a type of least squares method, and the evaluation value is the sum of squares of errors at calculation of the least squares method.

The method of the processing executed in S606 needs to be classified as a least squares method but is not limited to methods repeating an iteration.

In S607, the calibration information updating unit 304 determines whether the temporary calibration value corresponding to the minimum evaluation value has converged. If it is determined that the temporary calibration value has converged (YES in S607), the flowchart in FIG. 6 is terminated and outputs the temporary calibration value corresponding to the minimum evaluation value currently stored as the determined calibration value. If it is determined that the temporary calibration value has not converged yet (NO in S607), the process returns to S604. The processing from S604 to S607 is repeated until the temporary calibration value converges. In Embodiment 1, the temporary calibration value is determined to have converged in a case where the minimum evaluation value results in a root mean square, calculated from the sum of squares of the closest distances of all the light ray pairs, being 0.01 degrees or less in terms of angle of view.

The calibration value outputted as the result of the flowchart in FIG. 6 is replaced for the calibration information and is stored in S406. Executing the image conversion in S407 based on the updated calibration information provides stereo equirectangular images including less vertical misalignment of the subject between the right and left images.

In the above description, the calibration information is updated by determining the calibration value that minimizes the sum of squares of the closest distances of all the light ray pairs. However, the method of updating the calibration information is not limited to this method. As another method, the calibration information may be updated by: projecting each feature point of the left image onto the right image through the midpoint of the closest points; using as the evaluation value, the difference in coordinate between the corresponding feature point of the right image and the projected point to look for the calibration value that minimizes the sum of squares of errors of all the feature point pairs; and updating the calibration information based on the resulting calibration value. The evaluation value of the calibration value (calibration information) is not limited to the sum of squares and may be the mean sum of squares or the sum of absolute values. The evaluation value may be a value that increases with the reliability in calibration information.

As described above, in Embodiment 1, the calibration information is updated in cases where the predetermined vibration occurred. Even in a case where user operation is not performed after the optical axis was displaced due to vibration, it is possible to appropriately correct the optical axis misalignment and reduce the number of frames with lower image quality.

Another possible method is to determine frame by frame, calibration information corresponding to each frame and applying the determined calibration information to the image to perform image conversion. However, the captured images in plural frames are never completely identical, and in a case where a subject moves, the calibration information of each frame can vary slightly. Therefore, a video obtained by applying the calibration information updated frame by frame, to each frame appears as if small vibrations are occurring. Rather than change the calibration information frequently, therefore, it is preferable to update the calibration information when needed and apply the calibration information during the process of image conversion like Embodiment 1.

In Embodiment 1, since the calibration information is updated in a case where the predetermined vibration occurred, the power consumption can be smaller than that in the case where the calibration information is updated frame by frame. Furthermore, as another method to reduce the power consumption, it is possible to update the calibration information regularly, once per five minutes, for example. With such a method, however, even in a case where vibration, which can cause optical axis misalignment, occurred, it sometimes takes time for the calibration information to be updated. According to Embodiment 1, the calibration information can be updated after the optical axis misalignment due to vibration occurs.

In the description of Embodiment 1, the stereo images are fisheye images (equidistant projections). However, the target image is not limited to fisheye images. Normal lens images (central projections) may be obtained in S402.

In the description of Embodiment 1, the calibration information is determined to correct the optical axis tilt and offset misalignment of the right and left lens optical systems. However, the calibration information is not limited thereto. For example, in a case where the magnification or the focal length is misaligned between the right and left lens optical systems, the calibration information may further include a parameter to correct the misalignments. Furthermore, calibration information concerning the optical axes of both the right and left lenses may be calculated to be used in the correction.

In the description of Embodiment 1, the camera captures images while the image conversion is performed so as to reflect the calibration information on the captured images in real time. However, it is possible to determine the calibration information and perform the image conversion using an image stored in advance as the target image. Specifically, in S402, the image obtaining unit 305 may obtain the target image from the external storage 107, instead of the image sensor 110, and in S403, the vibration information obtaining unit 301 may obtain vibration information corresponding to the time before the time the obtained image is captured. In this case, there is no requirement for the processing from S401 to S407 of each frame to be finished within 33 ms, which is the duration of one frame in Embodiment 1.

In the description of Embodiment 1, the camera 100 is a stereo camera including right and left lens optical systems. However, the camera 100 may be a single-lens camera. For example, if an image of a marker at a fixed position in the camera body can be captured through the lens optical system, the calibration information can be determined based on displacement of the marker. Thus, the calibration information can be updated by determining the calibration value also using detection of the predetermined vibration like Embodiment 1. Even in a case where the marker does not exist, the calibration information can be determined based on displacement of the vanishing point.

In the description of Embodiment 1, the functional units as the image processing apparatus illustrated in FIG. 3 are included in the camera 100. The functional units as the image processing apparatus illustrated in FIG. 3 may be included by an apparatus, such as a PC, other than the camera 100.

Figure 7:
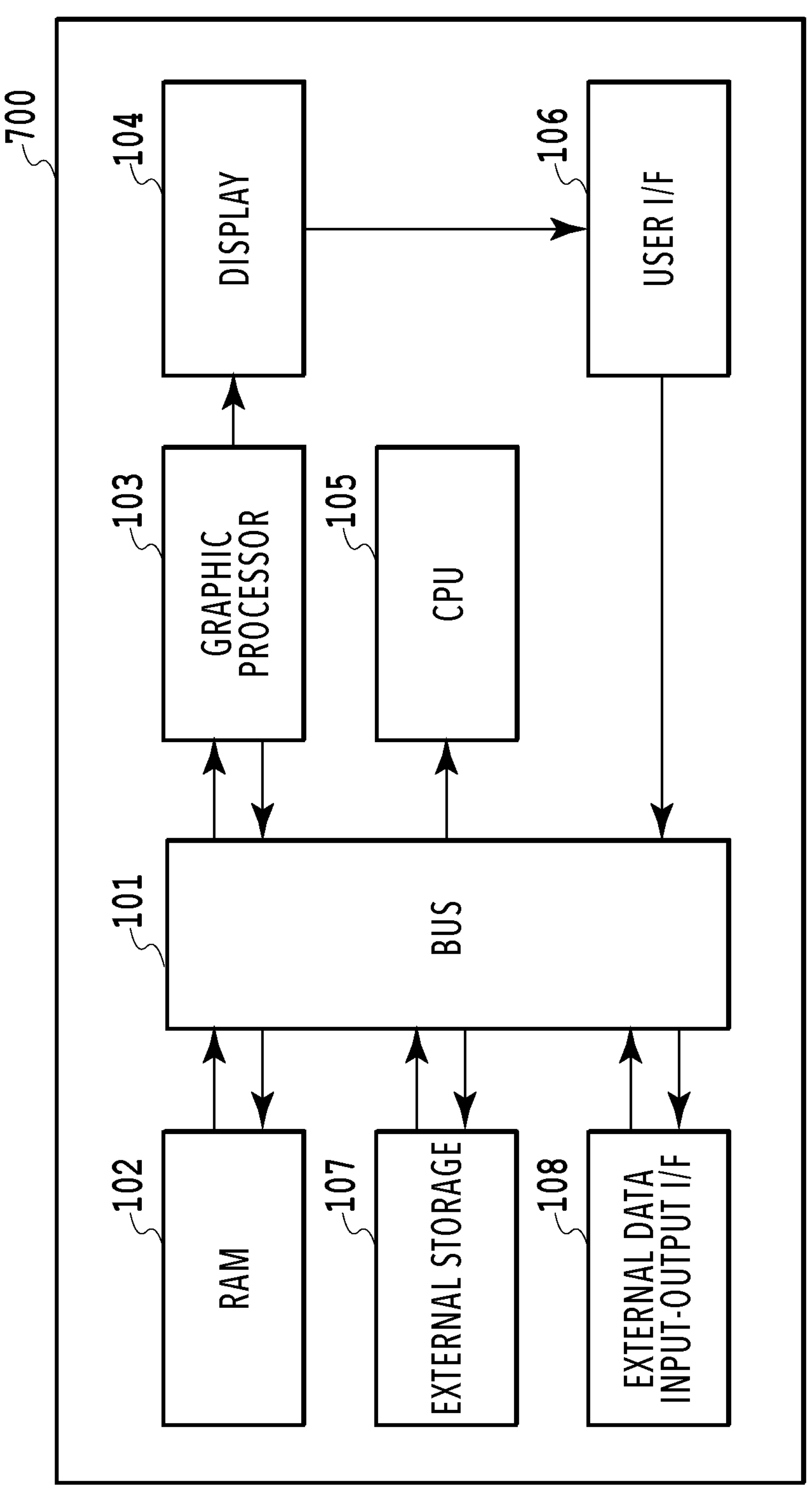
FIG. 7 is a diagram illustrating the hardware configuration of an image processing apparatus.

FIG. 7 is a block diagram illustrating the hardware configuration of a PC 700 including the functional units in FIG. 3. The same components as those of the camera 100 in FIG. 1 are given the same reference numerals, and the detailed description thereof is omitted. The basic hardware configuration of the PC 700 in FIG. 7 is the same as that of the camera 100, excepting that the PC 700 does not include the stereo lens optical system 111, the image sensor 110, the inertial sensor unit 112, or the like. The PC 700 is different from the camera 100 in that the computing ability of the CPU 105 of the PC 700 is higher than that of the camera 100 and the capacity of the RAM 102 thereof is greater than that of the camera 100. In a case where the PC 700 implements the functions included in the functional units in FIG. 3, the stereo images and vibration information outputted from the camera 100 are stored in the external storage 107 in FIG. 7. The image obtaining unit 305 obtains stereo images of the target frame from the external storage 107 in FIG. 7, for example.

According to the technique of the present disclosure, it is possible to appropriately update the calibration information in cases where vibration occurs in the camera.

Embodiment 2

In the description of Embodiment 1, the calibration information is updated in a case where the predetermined vibration is detected during image capturing. According to the method of Embodiment 1, for example, the calibration information is updated in a case where contact between the camera and a tripod or the like during image capturing causes the mount 201 to be loosened and displaced and causes the optical axes to be misaligned. However, with the method of Embodiment 1, the calibration information will be updated frame by frame in a case where the camera is constantly subjected to vibrations. The video obtained by applying the calibration information updated frame by frame to each frame will appear as if minute vibrations are occurring. In Embodiment 2, therefore, a method to reduce unwanted updates of the calibration information will be described. This method is to determine whether to update the calibration information based on the result from analyzing images in addition to the vibration information. Embodiment 2 will be described focusing on the differences from Embodiment 1. The configurations and processes not explicitly stated are the same as those of Embodiment 1.

Figure 8:
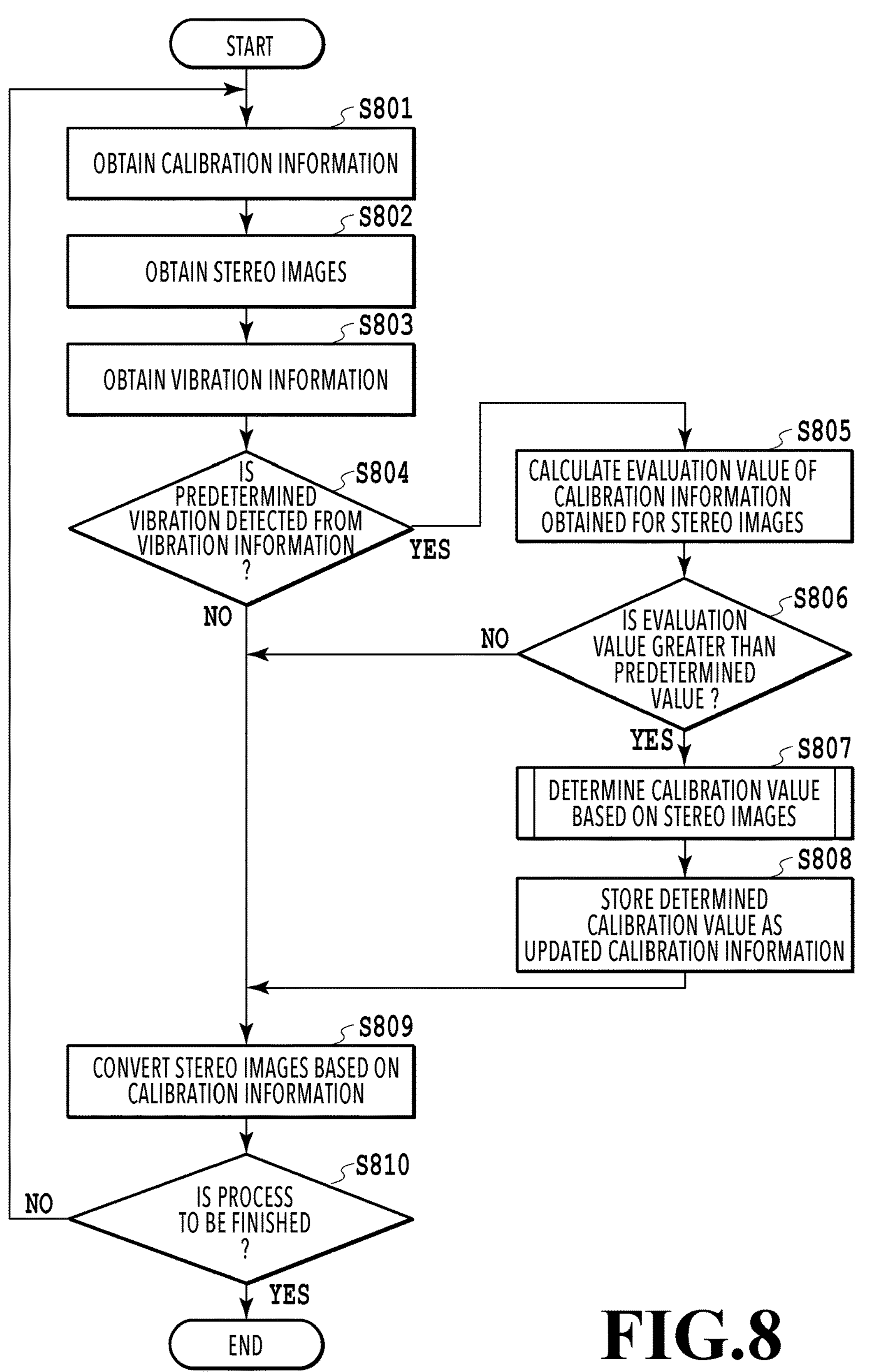
FIG. 8 is a flowchart for explaining a process to convert a stereo image based on calibration information.

FIG. 8 is a flowchart for explaining a process of Embodiment 2 to calculate the calibration information and convert stereo images based on the calculated calibration information. The processing from S801 to S804 is the same as the processing from S401 to S404 in FIG. 4, and the description thereof is omitted. The processing from S809 to S810 are the same as the processing from S407 to S408, and the description thereof is omitted.

If the vibration detection unit 302 determines that the predetermined vibration occurred (YES in S804), the vibration detection unit 302 allows the procedure to proceed to S805 and allows the calibration information updating unit 304 to operate. If the vibration detection unit 302 determines that the predetermined vibration did not occur (NO in S804), the vibration detection unit 302 allows the procedure to proceed to S809.

In S805, the calibration information updating unit 304 calculates the evaluation value in a case where the calibration information obtained in S801 (the calibration information before update) is applied to the stereo images of the target frame obtained in S802. The calculation method of the evaluation value is the same as the calculation method described in S605 in FIG. 6, which is the sum of squares of the closest distances of all the light ray pairs.

In S806, the calibration information updating unit 304 determines whether the evaluation value calculated in S805 is greater than a predetermined value. If the calibration information updating unit 304 determines that the evaluation value is greater than the predetermined value (YES in S806), the calibration information updating unit 304 allows the procedure to proceed to the process to S807. The evaluation value is a value correlating with optical axis misalignment. The predetermined value is an evaluation value calculated in a case where the mount 201 is loosened and displaced to cause displacement of the stereo lens optical system 111 and thereby cause optical axis misalignment.

In S801, the calibration information set or updated before the mount 201 is loosened and displaced is obtained. In a case where the mount 201 is loosened and displaced, in S802, stereo images captured after the mount 201 is loosened and displaced is obtained. In a case where the mount 201 is loosened and displaced to cause optical axis misalignment, the calibration information obtained in S801, which is calibration information before the mount 201 is loosened and displaced, is not for correcting the image captured after the mount 201 is loosened and displaced.

Furthermore, as described above, the less correct the calibration information, the greater the evaluation value calculated. In a case where the mount 201 is loosened and displaced, the evaluation value obtained by applying the calibration information obtained in S801 to the stereo images obtained in S802 is calculated to be high. By comparing the evaluation value calculated in S805 with the predetermined value, it is possible to detect whether the camera 100 was subjected to vibration significant enough to loosen and displace the mount 201. In Embodiment 2, the predetermined value is 0.5 degrees in terms of angle of view.

The processing from S807 to S808 is the same as the processing from $405 to S406 in FIG. 4, in which the calibration value corresponding to the stereo images of the target frame obtained in S802 is determined and the calibration information is updated. In a case where the stereo images captured after the mount 201 is loosened and displaced is obtained in S802, the calibration information is updated to the calibration value to correct the optical axis misalignment due to the loosening and displacement of the mount 201.

If the calibration information updating unit 304 determines that the evaluation value is not greater than the predetermined value (NO in S806), the procedure proceeds to the image conversion processing in S809. In this case, the procedure skips S807 and S808 and proceeds to S809 without updating the calibration information. In S809, image conversion is performed based on the calibration information obtained in S801.

In Embodiment 2, as described above, after the predetermined vibration is detected, it is determined whether optical axis misalignment significant enough that the mount 201 could be considered to be loosened and displaced occurred, based on the stereo images and calibration information. In a case where it is determined that optical axis misalignment significant enough that the mount 201 could be considered to be loosened and displaced occurred, the calibration information is updated. With such a process, it is possible to perform necessary updates of the calibration information while reducing unwanted updates of the calibration information.

Embodiment 2 employs the evaluation value that decreases with the reliability of the calibration information. However, the evaluation value is not limited thereto and may be configured to increase with the reliability. In this case, the conditional branches based on the magnitude of the evaluation value are inverted.

Embodiment 3

In Embodiment 3, another method to reduce unwanted updates of the calibration information will be described, similar to Embodiment 2. Embodiment 3 will be described, focusing on differences from Embodiment 1. The configurations and processes of Embodiment 3 not explicitly stated are the same as those of Embodiment 1.

Figure 9:
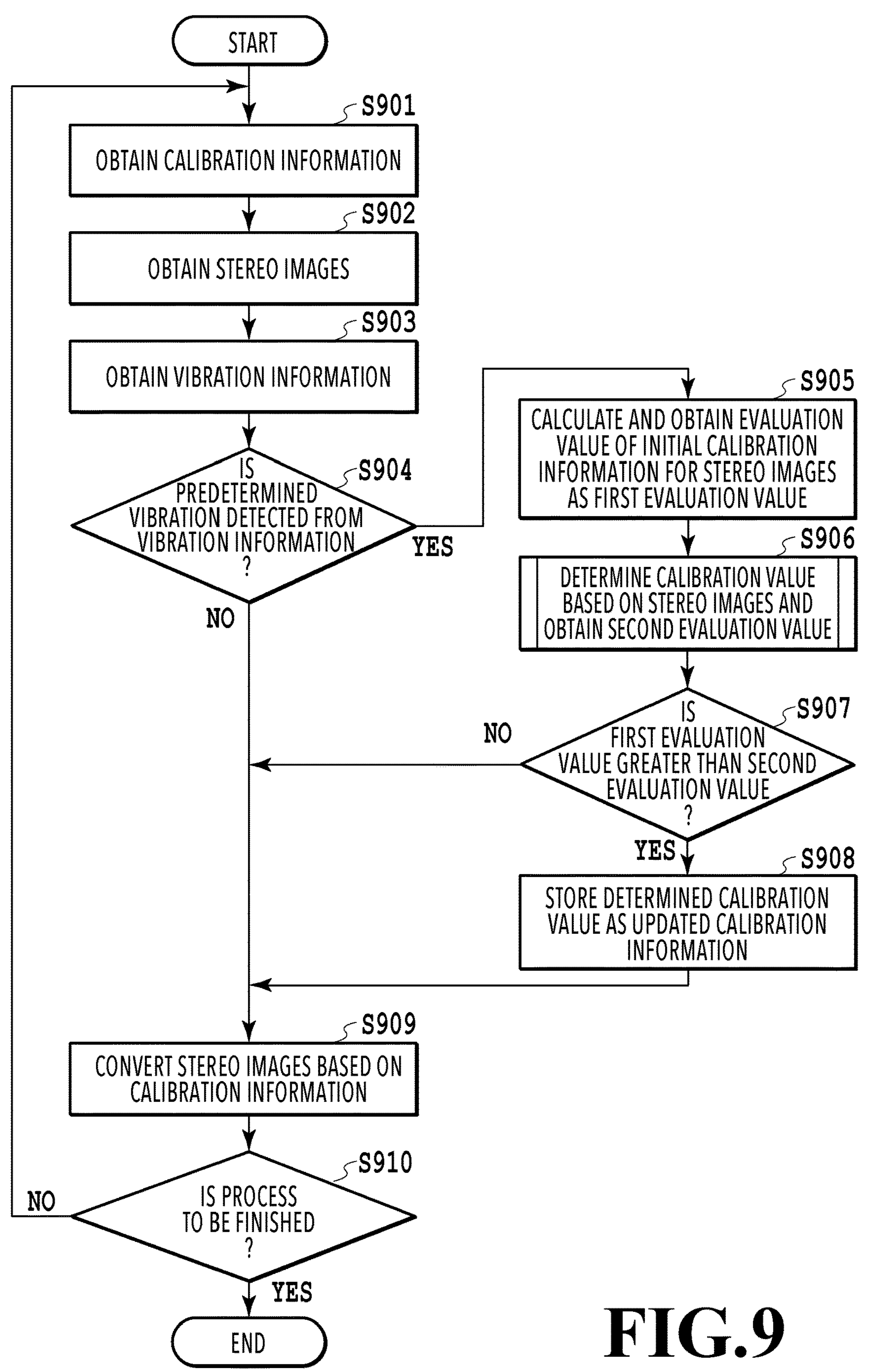
FIG. 9 is a flowchart for explaining a process to convert a stereo image based on calibration information.

FIG. 9 is a flowchart for explaining a process of Embodiment 3 to calculate the calibration information and convert stereo images based on the calibration information.

In S901, the calibration information obtaining unit 310 obtains the calibration information managed by the calibration information management unit 303. At the start of the flowchart in FIG. 9, the calibration information management unit 303 stores and manages in the storage unit, calibration information including a previously calculated initial value as initial calibration information. The initial calibration information is a value calibrated at manufacturing, for example. Alternatively, the stored initial calibration information may be calibration information stored when the power was last turned off.

Similar to the aforementioned embodiment, in a case where S908 later described was not executed, in S901, the calibration information obtaining unit 310 obtains the initial calibration information as the calibration information. In a case where S908 was executed for the previous frame, in S901, the calibration information obtaining unit 310 obtains the calibration information updated in S908 in the process for the previous frame.

The processing from S902 to S904 is the same as the processing from S402 to S404 in FIG. 4, and the description thereof is omitted. The processing from S911 to S912 is the same as the processing from S407 to S408, and the description thereof is omitted.

If the vibration detection unit 302 determines that the predetermined vibration occurred (YES in S904), the vibration detection unit 302 allows the procedure to proceed to S905 and allows the calibration information unit 304 to operate. If the vibration detection unit 302 determines that the predetermined vibration did not occur (NO in S904), the vibration detection unit 302 allows the procedure to proceed to S909.

In S905, the calibration information updating unit 304 applies the initial calibration information to the stereo images of the target frame obtained in S902 to calculate the evaluation value. The calculated evaluation value is called a first evaluation value.

In S906, the procedure described in FIG. 4 is executed as a sub-routine. The calibration information updating unit 304 determines the calibration value from the stereo images obtained in S902 and obtains the evaluation value corresponding to the determined calibration value as a second evaluation value.

In S907, the calibration information updating unit 304 determines whether the first evaluation value is greater than the second evaluation value. If the first evaluation value is determined to be greater, the calibration information updating unit 304 allows the procedure to proceed to S908. If the first evaluation value is not greater than the second evaluation value, the calibration information updating unit 304 allows the procedure to proceed to S909.

In S908, the calibration information updating unit 304 replaces the calibration information managed by the calibration information management unit 303 with the calibration value determined in S906 to update the calibration information to be used by the image conversion unit 306.

The processing from S909 to S910 is the same as the processing from S407 to S408 and the description thereof is omitted.

In Embodiment 3, as described above, similar to Embodiment 2, the calibration information is updated in a case where the predetermined vibration is detected and a predetermined condition is satisfied. Specifically, it is determined whether the mount 201 is loosened and displaced after the predetermined vibration, and in a case where the mount 201 can be considered to be loosened and displaced, the calibration information is updated. By updating the calibration information in a case where the occurrence of vibration is detected, the power consumption is less than that in the case of updating the calibration information frame by frame, for example.

In the description of Embodiment 3, the evaluation value is determined so as to decrease with the reliability of the calibration information. However, the evaluation value used in Embodiment 3 is not limited and may be configured to increase with the reliability. In this case, the conditional branches depending on the magnitude of the evaluation value are inverted.

Embodiment 4

In the method described in Embodiment 1, the detection of vibration occurrence, the update of calibration information, and the image conversion are performed within 33 ms, which is the duration of one frame. In Embodiment 4, a method to update the calibration information asynchronously with the image conversion procedure will be described.

Figure 10:
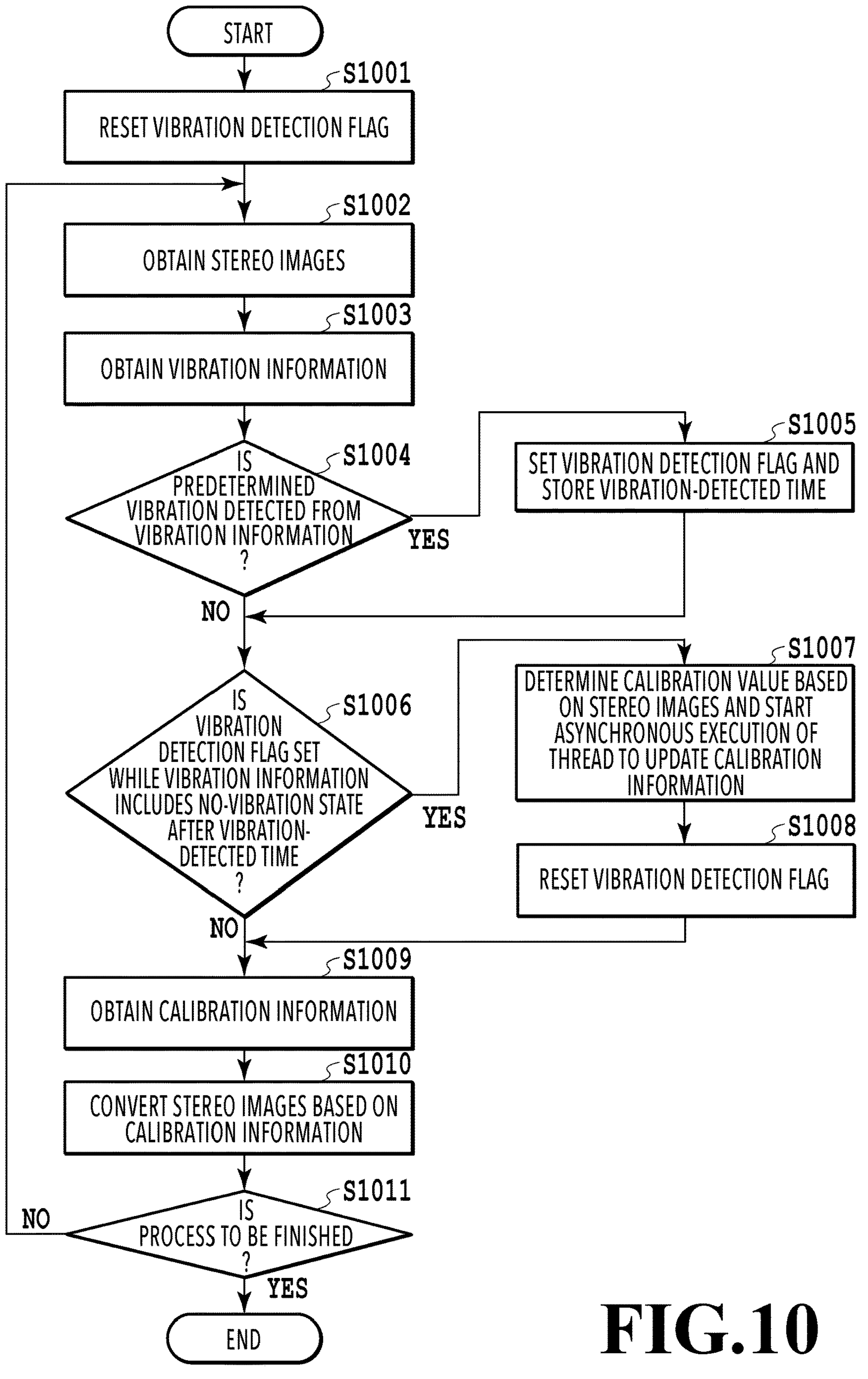
FIG. 10 is a flowchart for explaining a process to convert a stereo image based on calibration information.

FIG. 10 is a flowchart for explaining a process of Embodiment 4 to determine the calibration information and convert stereo images based on the calibration information.

In S1001, the vibration detection unit 302 performs initialization to reset a vibration detection flag.

The processing from S1002 to S1004 is the same as the processing from S402 to S404 in FIG. 4, and the description thereof is omitted.

If the vibration detection unit 302 determines that the predetermined vibration occurred (YES in S1004), the vibration detection unit 302 allows the procedure to proceed to S1005. If the vibration detection unit 302 determines that the predetermined vibration did not occur (NO in S1004), the vibration detection unit 302 allows the procedure to proceed to the process to S1006.

In 1005, the vibration detection unit 302 sets the vibration detection flag and stores the time (vibration detected time) at which the occurrence of the predetermined vibration was detected. The vibration detection unit 302 then allows the procedure to proceed to S1006. In a case where the vibration flag is already set, the vibration detection unit 302 only performs the process to record the vibration detected time. The accelerometer information as the vibration information of Embodiment 4 contains information in units of 4.167 ms, and the time at which an impact of 10G or higher was detected is stored in units of 4.167 ms.

In S1006, the vibration detection unit 302 determines whether or not the vibration detection flag is set while the vibration information contains a no-vibration state at some time after the vibration detected time.

The minimum accuracy at which the accelerometer detects an impact is, for example, about 0.3 G, and therefore, extremely minute vibration, such as air vibration, is represented as 0 G. In Embodiment 4, the no-vibration state refers to a state in which all the X, Y, and Z components of the accelerometer information as the vibration information are 0

G. "After the vibration-detected time" refers to after the most recent time among the recorded vibration-detected times, for example.

If the vibration detection unit 302 determines that the vibration detection flag is set and the no-vibration state is recorded after the vibration detected time (YES in S1006), the vibration detection unit 302 allows the procedure to proceed to S1007. If the vibration detection unit 302 determines that the vibration detection flag is not set or no no-vibration state is recorded after the vibration detected time (NO in S1006), the vibration detection unit 302 allows the procedure to proceed to S1009.

Figure 11:
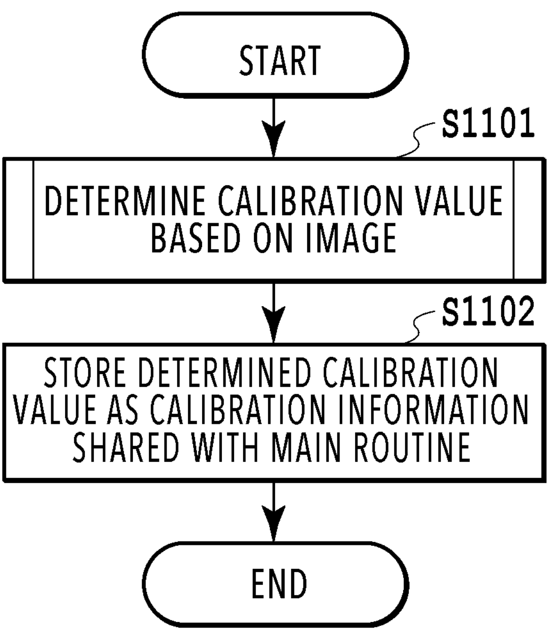
FIG. 11 is a flowchart for explaining the detail of processing of a thread.

In S1007, asynchronous execution of a thread illustrated in FIG. 11 to determine the calibration value from the stereo images and update the calibration information is started. Upon the start of the asynchronous execution of the thread, the procedure proceeds to S1008. In a case where the thread previously started to be executed is in progress, the processing of the thread is interrupted, and the execution of the thread is newly started. The processing of the thread started in S1007, which is described in detail later, is the same as the processing from S405 to S406 in FIG. 4. Specifically, the calibration value suitable for the stereo images is determined. The calibration information managed by the calibration information management unit 303 is then replaced with the determined calibration value to be updated. In Embodiment 4, the processing from S405 to S406 is executed asynchronously with the processing of the flowchart in FIG. 10. The calibration information is updated using an exclusive control mechanism.

In S1008, the vibration detection unit 302 resets the vibration detection flag and allows the procedure to proceed to S1009.

In S1009, the calibration information obtaining unit 310 obtains the calibration information managed by the calibration information management unit 303. The calibration information updated by the processing of the thread illustrated in FIG. 11 is updated using an exclusive control mechanism. In a case where the thread started in S1007 has not finished, the calibration information before update is obtained. The calibration information before update is calibration information including the initial value or, if the thread was executed before, the calibration information updated by the thread executed before.

The processing from S1010 to S1011 is the same as the processing from S407 to S408 in FIG. 4, and the description thereof is omitted.

FIG. 11 is a flowchart for explaining the detail of the processing of the thread instructed to start in S1007.

In S1101, the calibration information updating unit 304 determines the calibration value from the stereo images obtained in S1002. In the processing in S1101, the flowchart in FIG. 4 is executed as a sub-routine.

In S1102, the calibration information management unit 303 manages the calibration information shared with the main routine. The calibration information updating unit 304 replaces the managed calibration information with the calibration value determined in S1101 to update the managed calibration information. The update is performed using an exclusive control mechanism.

In Embodiment 4, as described above, the processing is performed such that it can take 33 ms or more, which is the duration of one frame, to execute the determination of the calibration information. For example, it may take about three seconds for the thread in FIG. 11 to be executed. In Embodiment 4, furthermore, it is determined not only whether vibration is detected but also whether vibration has stopped. This can eliminate the requirement to finish the processing within 33 ms and allows for calculation using a comparatively weak CPU. No requirements for processing time leads to low power consumption. In Embodiment 4, it takes time for the appropriate calibration information to be reflected after occurrence of strong vibration is detected. However, images in the captured image are blurred due to vibration, and it takes time for the images to be recognized after the vibration finishes. If appropriate optical axis correction can be performed within a short enough time, the user is able to continue viewing the stereo images without being aware of optical axis misalignment.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-139524 filed Aug. 30, 2023, which is hereby incorporated by reference herein in its entirety.

What is claimed is:

1. An image processing apparatus for calibrating an image capture apparatus that includes an optical system and an imaging sensor, the image processing apparatus comprising:

at least one processor or circuit configured to function as a plurality of units comprising:

(1) an obtaining unit configured to obtain an image captured by the image capture apparatus;

(2) a detection unit configured to detect whether predetermined vibration occurred in the image capture apparatus;

(3) a correction unit configured to perform a process of correction on the image captured by the image capture apparatus based on calibration information; and (4) an updating unit configured to update, asynchronously with the process of the correction performed by the correction unit, the calibration information based on the image obtained by the obtaining unit, in a case where the detection unit detects that the predetermined vibration has stopped.

2. The image processing apparatus according to claim 1, wherein the updating unit updates the calibration information based on the captured image after the detection unit detects that the predetermined vibration has stopped.

3. The image processing apparatus according to claim 1, wherein the updating unit updates the calibration information in a case where a predetermined condition is satisfied.

4. The image processing apparatus according to claim 3, wherein the updating unit updates the calibration information in a case where an evaluation value of the calibration information before the calibration information is updated for an image captured by the image capture apparatus after the predetermined vibration occurred satisfies the predetermined condition.

5. The image processing apparatus according to claim 4, wherein the case where the predetermined condition is satisfied includes a case where the image capture apparatus is subjected to misalignment of the optical system.

6. The image processing apparatus according to claim 2, wherein the updating unit determines an evaluation value of the captured image applied to a temporary calibration value after the predetermined vibration occurs and sets the temporary calibration value as the updated calibration information in a case where the determined evaluation value reaches a predetermined value.

7. The image processing apparatus according to claim 6, wherein the evaluation value is a value corresponding to the sum of squares of errors in a least squares method.

8. The image processing apparatus according to claim 1, wherein the correction unit, based on the calibration information, corrects the influence of optical axis misalignment in the optical system on the image captured by the image capture apparatus.

9. The image processing apparatus according to claim 1, wherein for a frame before the updating unit updates the calibration information, the correction unit corrects the influence based on the calibration information before the calibration information is updated, and wherein for a frame after the updating unit updates the calibration information, the correction unit corrects the influence based on the calibration information after the calibration information is updated.

10. The image processing apparatus according to claim 1, wherein the image capture apparatus includes a sensor, wherein the detection unit obtains a value of the sensor, and wherein in a case where the obtained value of the sensor exceeds a predetermined value, the detection unit detects that the predetermined vibration occurred.

11. The image processing apparatus according to claim 10, wherein the sensor is an accelerometer.

12. The image processing apparatus according to claim 1, wherein the optical system includes a first optical system and a second optical system.

13. An image processing method to calibrate an image capture apparatus that includes an optical system and an imaging sensor, the method comprising:

obtaining an image captured by the image capture apparatus;

detecting whether predetermined vibration occurred in the image capture apparatus;

performing a process of correction on the image captured by the image capture apparatus based on calibration information; and updating, asynchronously with the process of the correction, the calibration information based on the obtained image, in a case where the detecting detects that the predetermined vibration has stopped.

14. A non-transitory computer-readable storage medium storing a program which causes a computer to perform an image processing method to calibrate an image capture apparatus that includes an optical system and an imaging sensor, the image processing method comprising:

obtaining an image captured by the image capture apparatus;

detecting whether predetermined vibration occurred in the image capture apparatus;

performing a process of correction on the image captured by the image capture apparatus based on calibration information; and updating, asynchronously with the process of the correction, the calibration information based on the obtained image, in a case where the detecting detects that the predetermined vibration has stopped.

* * * * *